United States Patent [19]

van der Lely

[11] 4,236,613

[45] Dec. 2, 1980

[54] COUPLING MEMBER

[76] Inventor: Cornelis van der Lely, 7, Brüschenrain, Zug, Switzerland

[21] Appl. No.: 905,966

[22] Filed: May 15, 1978

[30] Foreign Application Priority Data

May 9, 1977 [NL] Netherlands ............... 7705056

[51] Int. Cl.³ .............................................. F16F 9/44
[52] U.S. Cl. .................................... 188/300; 172/261;
172/439; 177/208; 248/354 H; 280/482;
188/312; 188/313; 188/314; 188/318; 188/322
[58] Field of Search .............. 188/300, 312, 318, 313,
188/314, 315, 322; 177/208, 146; 248/354 H;
172/261, 439; 74/586; 280/482

[56] References Cited

U.S. PATENT DOCUMENTS

| 1,882,628 | 9/1931 | Lincoln | 177/208 X |
| 1,995,996 | 3/1935 | Moore | 177/208 X |
| 2,405,980 | 8/1946 | Sands et al. | 172/439 X |
| 2,635,868 | 4/1953 | Reid et al. | 177/208 X |
| 3,286,797 | 11/1966 | Leibfritz et al. | 188/300 |
| 3,905,425 | 9/1975 | Jackson | 188/300 X |
| 3,929,057 | 12/1975 | Kondo | 188/318 X |
| 4,084,668 | 4/1978 | Rybicki | 188/314 X |

FOREIGN PATENT DOCUMENTS 1326586  4/1963  France ............... 188/314

Primary Examiner—George E. A. Halvosa
Attorney, Agent, or Firm—William B. Mason

[57] ABSTRACT

An elongated coupling member is connectable to the upper link of a three point tractor lift and to an implement carried by the lift, such as a spreader. The member includes a piston slideably mounted in a cylinder and a hydraulic circuit between a space at each side of the piston. The piston can be adjusted to a set position in which the relative positions of the piston and cylinder are maintained by hydraulic fluid within the circuit and spaces. An overload device, such as a spring biased, one-way valve, is included in the circuit so that upon overload, the piston moves, usually to lengthen the coupling member and allow fluid to flow from one space to the other. In one version, an overflow space or reservoir is in the circuit to accomodate excess fluid when the piston is shifted and one space is larger than the other. A pressure gauge in the hydraulic circuit indicates the fluid pressure in the circuit and since the pressure decreases incrementally as material is being spread from the implement, a measure of the amount of material dispensed can be gained.

9 Claims, 7 Drawing Figures

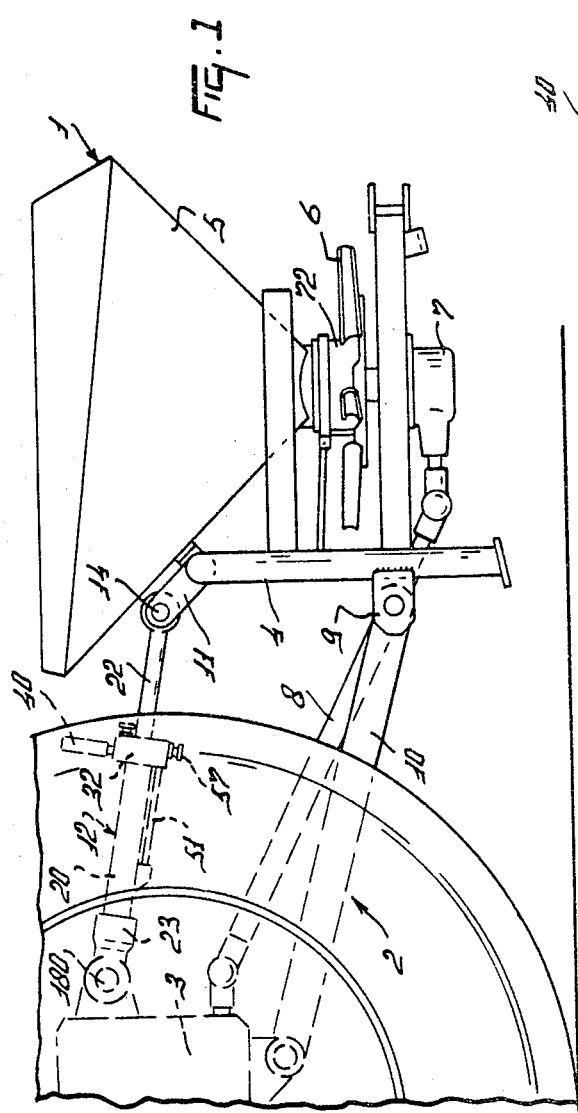
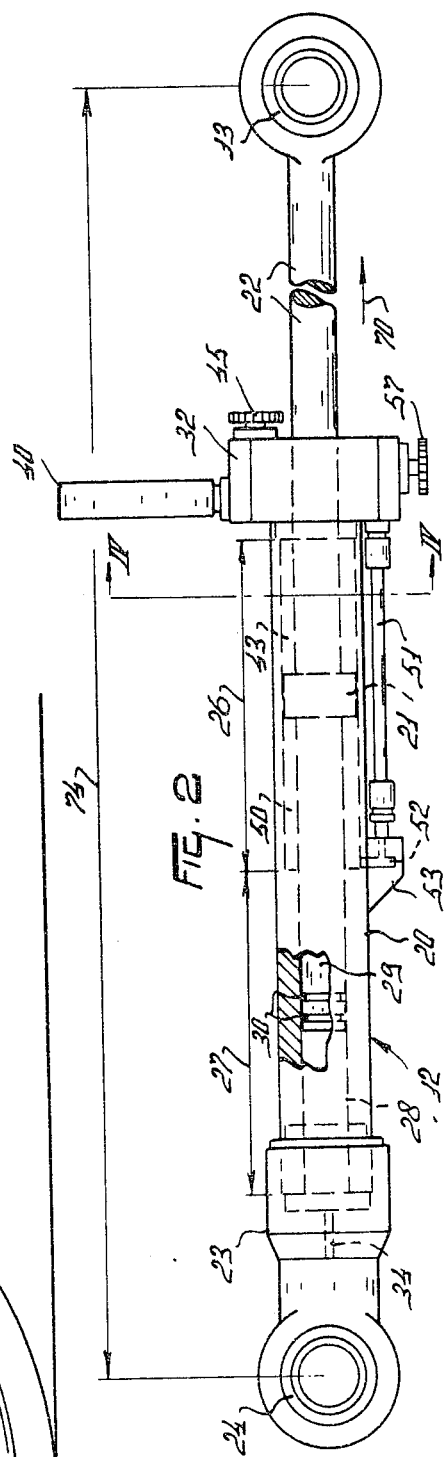

COUPLING MEMBER

According to a first aspect of the present invention there is provided a coupling member in the connection between a device for spreading material and the lifting device of a tractor or the like vehicle. The coupling member comprises two portions which are displaceable relative to one another and define a chamber the volume of which varies as the portions move relatively to one another. Indicating means is provided which is responsive to the pressure of a fluid in the chamber.

According to a second aspect of the present invention there is provided a coupling member comprising two portions which are displaceable relative to one another and define a chamber the volume of which varies as the portions move relatively to one another. Indicating means is provided which is responsive to the pressure of a fluid in the chamber, and an adjusting mechanism is provided for setting the two portions in a selected relative position and for retaining them in that position during normal operation of the coupling member. An overload safety mechanism is provided for permitting relative displacement of the two portions upon a load in excess of a predetermined load being applied to the coupling member.

With a construction in accordance with the present invention, the indicating means provides an indication of the forces produced, for example, by an implement during its use, when attached to the lifting device of a tractor by the coupling rod.

In an advantageous embodiment the two portions comprise a piston and a cylinder, which allows a satisfactory, strong construction to be obtained. The chamber may be provided between the piston and a cylinder cap closing the cylinder, through which cap a piston rod connected with the piston can move. The chamber may be filled with a fluid such as oil.

The two portions may be relatively adjustable so that the length of the coupling rod can be varied and the two portions can be set at will in at least two working positions relative to one another. Thus an implement supported by the coupling member can be positioned with respect to a tractor, while the effect of the coupling member is maintained.

The coupling rod may be connected to provide an overload mechanism protecting the implement from overload. This may be achieved by providing an overload safety means between the chamber and an overflow space. When a given pressure of the fluid in the chamber is exceeded, the safety means becomes operative to provide communication to the overflow space so that the two portions can move relative to one another and the overload of the implement is relieved or becomes obvious to an operator so that it can be eliminated.

The communication between the spaces on the two sides of the piston may include a controllable safety mechanism which is operative to allow relative movement of the two portions in a direction opposite that in which they normally tend to move during the use of the implement. The coupling member may thus incorporate a safety mechanism for the case in which the implement is unexpectedly exposed to forces which do not occur in normal operation. This safety mechanism would become operative, for example, when the implement strikes some object during manoeuvring.

For a better understanding of the present invention and to show how it may be carried into effect, reference will now be made, by way of example only, to the accompanying drawings, in which:

FIG. 1 is a side elevation of a fertilizer distributor coupled with the lifting device of a tractor;

FIG. 2 is an enlarged side elevation of part of the lifting device;

Figure 3:
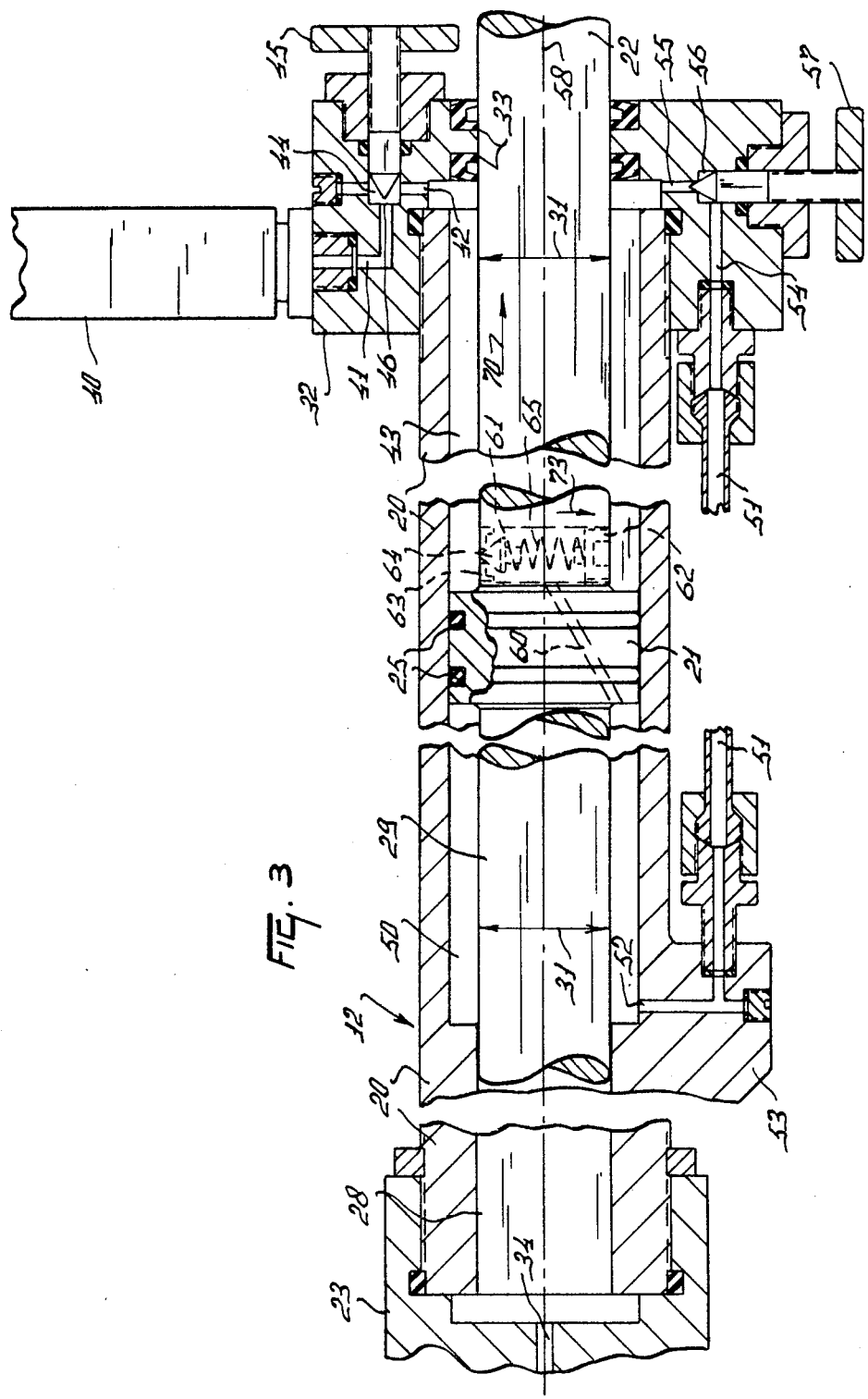
FIG. 3 is an enlarged, vertical sectional view of the part rod shown in FIG. 2.
Figure 4:
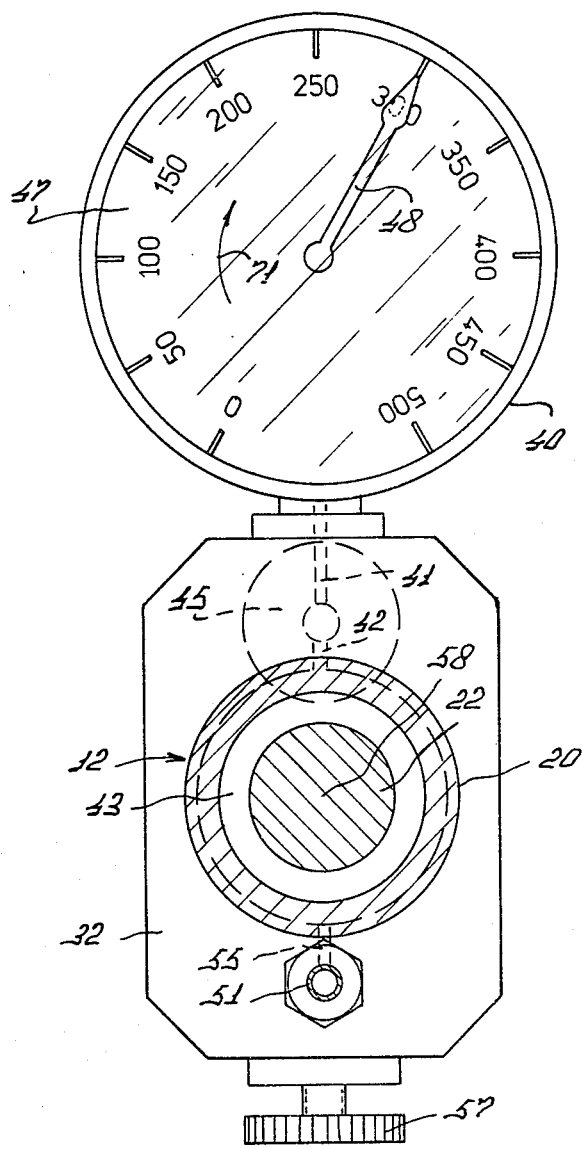
FIG. 4 is a sectional view taken on the line IV—IV in FIG. 2.

The embodiment shown in FIGS. 1 to 4 is a fertilizer distributor 1 coupled with the lifting device 2 of a tractor 3. The distributor 1 comprises a frame 4 on which a hopper 5 is arranged. Beneath the hopper 5 there is a spreading member 6 which is driven from a gear box 7; this gear box 7 is coupled through an auxiliary shaft 8 with the power take-off shaft of the tractor 3. The frame 4 has two fastening supports 9, to which are fastened lower arms 10 of the lifting device 2. There is also a top rod 12 arranged between the tractor 3 and a fastening support 11 at the top of the frame 4. The top rod 12 has at one end a ball-and-socket joint 13, which is secured by a pin 14 to the support 11.

The top rod 12 comprises two relatively movable portions constituted respectively by a cylinder 20 and a piston 21 with a piston rod 22. The ball-and-socket joint 13 is mounted on the end of the piston rod 22. The cylinder portion 20 has at the end a fastening eyelet 23 having a ball-and-socket joint 24, which can be coupled with the tractor 3. The cylinder 20 has a portion 26 with a bore in which the piston 21 is a close fit, the piston being provided with rings 25. The cylinder 20 also has a portion 27, having a bore 28 which supports an auxiliary piston rod 29 which is provided with sealing rings 30. The piston rod 22 and the auxiliary piston rod 29 have equal diameters 31. The end of the portion 26 of the cylinder 20 is provided with a cylinder cap 32 having sealing rings 33 fitting around the piston rod 22.

To the cylinder cap 32 is secured a pressure gauge 40, which communicates through channels 41 and 42 in the cap 32 with the space 43 in the cylinder 20. The channel 42 opens into this space at a location outside the cylinder 20 (FIG. 3). The channels 41 and 42 communicate with one another through a bore 44 holding a valve 45, which can close an aperture 46 between the bore 44 and the channel 41. The pressure gauge 40 has a dial 47 having a scale divided into ten ranges indicating the load in kilograms. The scale covers an overall range from 0 to 500 kgs at intervals of 50 kgs. The pressure gauge has a pointer 48 rotatably arranged at the center of the gauge.

The space 50 located on the other side of the piston 21 from the space 43 and facing the coupling member 23 connected with the tractor 3 communicates through a duct 51 located outside the cylinder 20 with the space 43. The metal duct 51 is parallel to the cylinder 20 and communicates with a channel 52, in an enlarged part 53 of the cylinder 20, which communicates with a space 50. The other end of the duct 51 communicates with channels 54 and 55, provided in the cylinder cap 32, which communicate with one another through a bore 56. The channel 55 opens out, outside the cylinder 20, into the space 43 on the inner side of the cylinder cap 32. The cylinder cap 32 is provided with a shut-off valve 57 by which the communication between the channel 55 and the bore 56 can be closed. The valve 57 is perpendicular to the centerline of the cylinder cap 32, whereas the valve 45 is parallel to that centerline.

The spaces 43 and 50 also communicate with one another through a channel 60 passing through the piston 21 and opening out on one side in the space 50 at a location radially outside the auxiliary piston rod 29 and on the other side in a bore 61 extending transversely of the length of the piston rod 22. The bore 61 is closed at one end by a plug 62 and has at the other end a seat 63 for a valve member 64. Between the valve member 64 and the plug 62 there is a compression spring 65. The plug 62 can be screwed to a greater or lesser extent into the inner thread of the bore 61 for adjusting the force applied by the compression spring 65.

By using the top rod 12 in the fastening system of the agricultural implement to the lifting device the following effect is obtained. When the implement 1 is connected with the lower arms 10 and the top rod 12, the weight of the implement and of the material, if any, contained in the hopper exerts a tensile force on the top rod 12. Therefore, the piston rod 22 tends to move in the direction of the arrow 70 (FIG. 2) with respect to the cylinder 20. The spaces 43 and 50 contain a fluid such as a hydraulic oil. Under the action of the weight of the implement 1 in the direction of the arrow 70 on the piston rod 22 and hence on the piston 21, the medium in the space 43 is subjected to pressure. The space 43 is isolated from the space 50 during operation of the implement by closing the channel 55 by means of the valve 57, as is illustrated in FIG. 3. The valve 45 is opened during operation of the implement so that the pressure of the fluid in the space 43 propagates through the channels 42 and 41 to the pressure gauge 40. The pressure gauge 40 provides an indication of the pressure exerted on the fluid in the space 43 by the weight of the implement. The pressure is displayed on the dial 47 in kilograms. The pressure gauge is adjusted so that the pointer 48 is at the zero indication the hopper is empty, and the weight of the implement alone is supported by the lifting device. When the hopper is filled, the pressure on the fluid in the space 43 increases so that the pointer 48 turns in the direction of the arrow 71. The dial is such that, when the hopper is completely filled, for example, with 500 kgs, the pointer 48 is at the number 500. From 0 to 500 the scale is divided in tens so that it can be read from the dial how many kilograms of material are contained in the hopper. When the implement is run over a field, for example, for spreading fertilizer or seed, the weight of the material contained in the hopper 5 decreases and the pointer 48 of the pressure gauge will move in the direction opposite the direction of the arrow 71. It is thus possible to see what quantity of material has been delivered from the hopper when a given distance has been covered. Since the quantity of material to be delivered per unit of length to be covered will have been previously determined, the dial 47 of the pressure gauge provides an indication of whether the desired quantity of material has, in fact, been delivered over the given length. In order to adjust the quantity of material to be delivered per unit of length the implement is provided with a dosing mechanism 72 arranged between the lower end of the hopper 5 and the spreading member 6. In dependence upon the indication of the pressure gauge 40, the dosing member can be readjusted for delivering more or less material per unit of length in relationship to the desired quantity of material to be spread per unit of surface. When the implement runs along uneven soil, the weight of the implement 1 and of the material contained in the hopper 5 will exert a varying pressure of the fluid in the space 43. In order to even out these abrupt increases and decreases in pressure as far as possible, the valve 45 can be closed to a greater or lesser extent into the opening 46 of the channel 41 so that flow between the pressure gauge 40 and the space 43 is slightly throttled as a result of which pressure differences in the space 43 on the fluid can be damped to some extent. Damping of the pressure gauge may also be achieved in a different way so that the abrupt changes of the pressure on the fluid in the space 43 are eliminated and the pointer 48 will not fluctuate too greatly.

The valve member 64 with the spring 65 can be adjusted so that, when the pressure in the space 43 becomes too high, the valve member 64 will move in the direction of the arrow 73 (FIG. 3) against the pressure of the spring 65. The fluid in the space 43 can then pass through the bore 61 in the channel 60 into the space 50 so that the piston 21 can move along the cylinder 20. Movement of the piston 21 and hence of the piston rod 22 with respect to the cylinder 20 in the direction of the arrow 70 results in an increase in distance between the coupling points 13 and 24 of the top rod 12 so that the position of the distributor and of the lifting device will vary. This change of the position of the distributor provides an indication to the tractor driver that the top rod is loaded more heavily than is desirable. The spring 65 may be adjusted so that the top rod will lengthen and cause the implement to lower its position with respect to the lifting device only when an excessive quantity of material is loaded into the hopper or is placed on the hopper. In this way the valve member 64 with the spring 65 constitutes an overload mechanism preventing excessive load on the implement.

If for some reason or other the pressure gauge need not be used, it can be put out of operation by closing the valve 45 so that the channel 41 no longer communicates with the space 43.

The distance 74 between the coupling eyelets 13 and 24 of the top rod 12 can be adjusted by displacing the piston 21 with the piston rod 22 with respect to the cylinder 20. To do this, the valve 57 is opened so that the channel 55 establishes a communication between the space 43 with the space 50 through the channel 54, the duct 51 and the channel 52. The spaces on both sides of the piston 21 thus communicate with one another so that the piston 21 can be readily moved at will in one direction or the other the length of the portion 26 of the cylinder 20 determines the range of adjustment for the distance 74. After this adjustment the valve 57 is closed again so that the space 43 is separated from the space 50. The piston 21 can then no longer move in the cylinder 20, unless excessive pressure is exerted in the medium in the space 43, as a result of which the valve 64 becomes operative. In this way the cylinder 20 and the piston 21 can be fixed at will in any one of a plurality of positions relative to one another. The auxiliary piston rod 29 is provided because movement of the piston 21 in the cylinder 20 results in a reduction of volume on one side of the piston 21 which has to be equal to an increase in volume on the other side. The quantity of fluid to be passed from one side of the piston in order to shift the piston must be allowed to arrive at the other side of the piston. The auxiliary piston rod 29 is supported in the portion 27 of the cylinder 20. The space in the bore 28 beyond the auxiliary piston rod 29 communicated through an opening 34 in the coupling member 23 with the open air so that displacement of the auxiliary piston rod in the bore 28 will not be counteracted.

Figure 5:
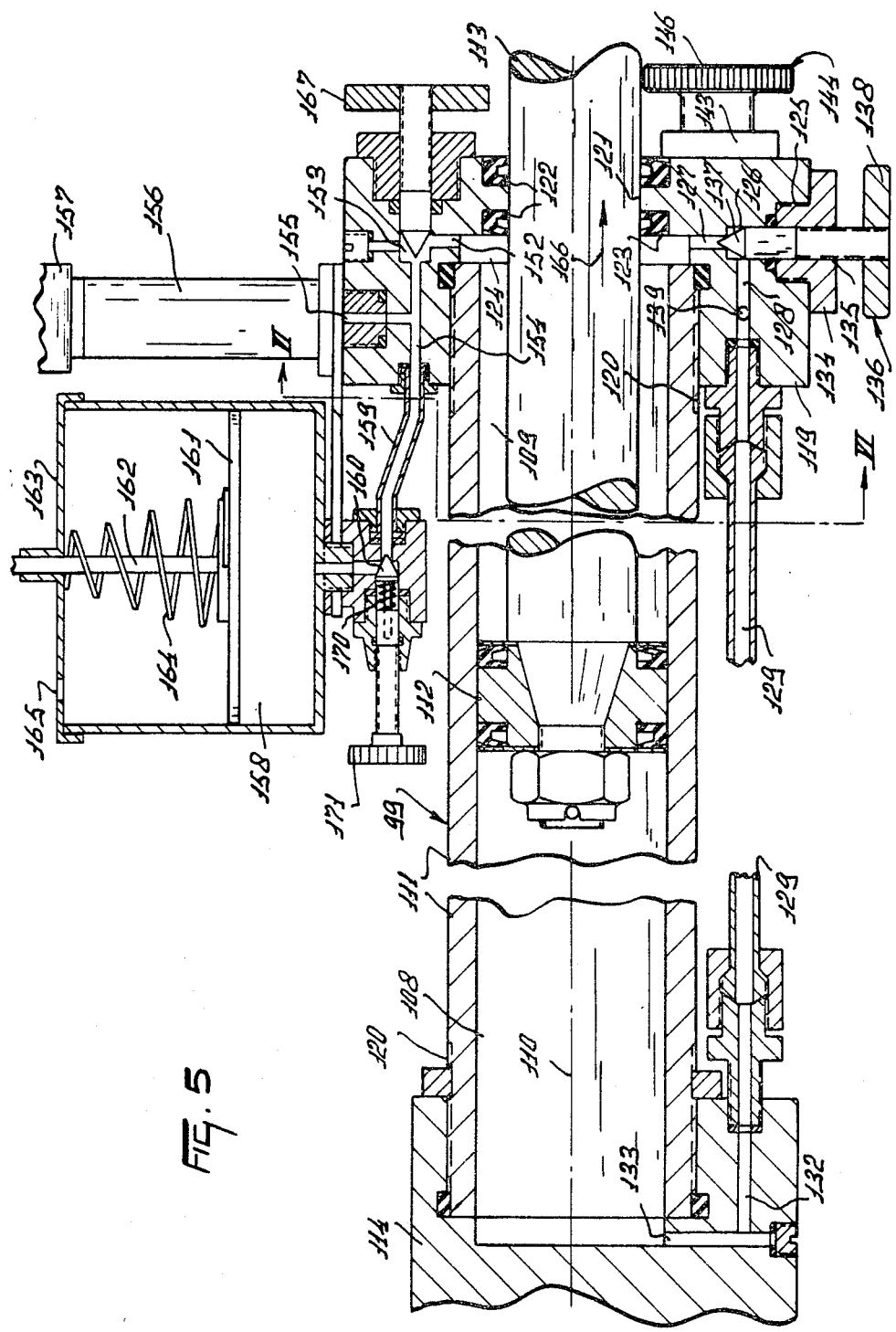
FIG. 5 is a vertical sectional view similar to that of FIG. 3 showing a further embodiment.
Figure 6:
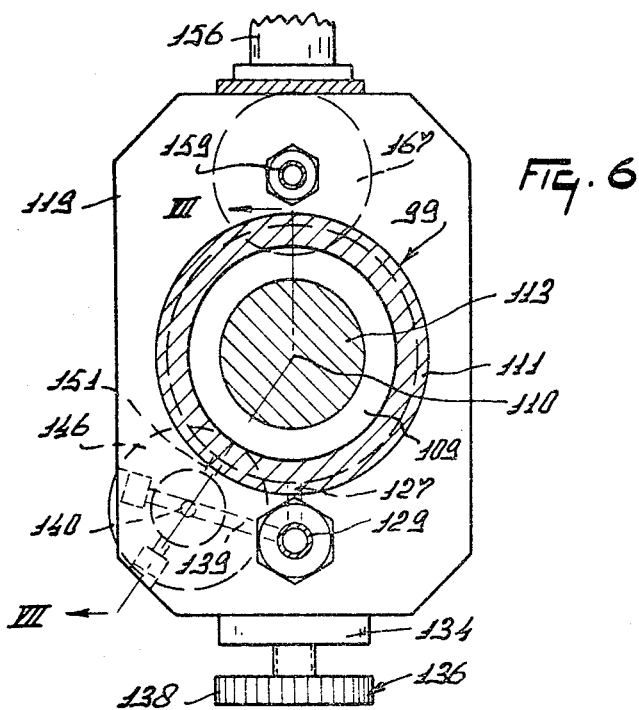
FIG. 6 is a sectional view taken on the line VI—VI in FIG. 5.
Figure 7:
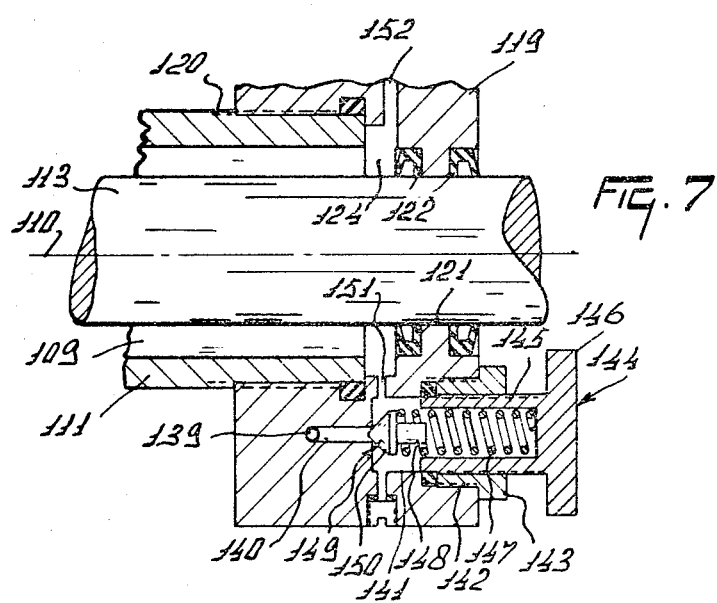
FIG. 7 is a sectional view taken on the line VII—VII in FIG. 6.

FIGS. 5, 6 and 7 show a different construction for a coupling rod 99 for connecting an implement with a tractor in the same manner as illustrated in FIG. 1. The coupling rod 99 comprises a cylinder 111 and a piston 122, which is axially movable along the cylinder. The piston is secured to a piston rod 113. The cylinder 111 constitutes a first coupling portion and the piston rod 113 a second coupling portion of the coupling rod. At the front the cylinder 111 is provided with an end portion 23 to which a fastening member formed by an eyelet 24 is secured, in which a bearing is arranged surrounding a pivotal shaft 180 passing through the eyelet 24. The piston rod 113 has at its end remote from the piston 112 a fastening member formed by an eyelet 13 holding a bearing. Through the bearing can be passed a pin extending substantially parallel to the pivotal shaft 180 through the eyelet 24 and forming part of the topmost junction of the support 11.

At the end away from the end portion 23 the cylinder 111 is provided with a cylinder cap 119, which is screwed by means of screwthread 120 onto the end of the cylinder 111 (FIG. 5). The cylinder cap 119 supports the piston rod 113 in a bore 121 which is coaxial with the centerline 110 of the cylinder 111. The bore 121 has seals 122 at each end for sealing against the piston rod 113.

The cap 119 also has a cylindrical recess 123, which is coaxial with the centerline 110. The recess 123 has a cylindrical wall forming a prolongation of the boundary surface formed by the screwthread 120 of the cap 119 surrounding the cylinder 11. The end surface of the recess 123 is perpendicular to the centerline 110 and is located at a short distance behind the end face of the cylinder 111, which is parallel to it, a space 124 being thus formed. The space 124 communicates with the space 109 between the inner surface of the cylinder 111 and the outer surface of the piston rod 113.

The external cylindrical surface of the cylinder cap 119 has a tapped bore 125, communicating with a bore 126 and with a bore 127 opening out into the space 124. The bore 126 communicates, through a bore 128 extending parallel to the centreline 110, with a duct 129. The duct 129 extends parallel to the centerline 110. The duct 129 communicates at its end away from the cap 119 with a bore 132 in the end portion 23 and a bore 133 communicating with a portion 108 of the interior of the cylinder 111.

The bore 125 contains a guide member 134 with an external screwthread co-operating with the screwthread of the bore 125. The guide member 134 has an uninterrupted tapped hole 135 into which is screwed a set screw 136 having a conical end 137, which is, at least in the position shown, in engagement with the transitional area between the bores 126 and 127, thus separating these bores. The set screw 136 is provided with an adjusting knob 138.

The cylinder cap 119 also has a bore 139 (FIGS. 5 and 6) opening out into the bore 128. Some distance from the place where it meets the bore 128, the bore 139 communicates with a bore 140, which is parallel to the centerline 110 (FIG. 6). The bore 140 opens out into a bore 141 (FIG. 7), which is coaxial with the bore 140, but is some times larger in diameter than the bore 140. The bore 141 opens out at the end face of the cap 119 away from the end portion 23. The bore 141 has an internal screwthread 142 receiving a guide member 143 in which is screwed an adjusting member 144. The adjusting member 144 comprises a hollow cylindrical portion 145 which opens towards the bore 140 and which is in open communication with the space in the bore 141. The cylindrical portion 145 has an adjusting knob 146 having a dial displaying the adjusted setting of the limit value of the fluid pressure of force at which a valve 149 opens. The space enclosed in the portion 145 accommodates a compression spring 147 bearing on one side on the inner side of the adjusting knob 146 and on the other side supporting a stem 148 of the adjustable pressure relief valve 149. The valve 149 has a conical end 150 which, in normal operation, is in contact with the transitional region between the bores 140 and 141, thus separating these bores. The bore 141 communicates through a bore 151 with the space 124 (FIG. 7).

Referring to FIG. 5, the cylinder cap 119 has a bore 152 opening out into a space 153. The space 153 communicates with a bore 154, which communicates through a channel 155 and an intermediate portion 156 with a pressure gauge 157. Communication between the space 153 and the bore 154 can be prevented by a closure member 157. To the cap 119 is also fastened an overflow reservoir 158. The overflow reservoir communicates through a duct 159 and a closure member 160 with the bore 154. The reservoir contains a piston 161 having a guide rod 162 extending through an aperture in the reservoir cover 163 out of the reservoir. Between the inner side of the cover 163 and the top of the piston 161 there is a light compression spring 164. The cover 163 has an opening 165 establishing a communication between the space between the cover 63 and the piston 161 and the open air. The hydraulic circuit including the spaces 109 and 108 inside the cylinder 111 on both sides of the piston 112 outside the piston rod 113 as well as the space 124, the bore 127, part of the bore 126, the bore 128, the duct 129, the bores 132 and 133, the bores 139, 140, 141, 151, 152, 154 and 155 is completely filled with hydraulic fluid.

In normal operation the eyelet 24 of the top rod 99 surrounds the pivotal shaft fastened to the tractor frame, whereas the eyelet 13 surrounds a rod fastened to the top connecting support of the frame 4 of the agricultural implement hitched to the tractor. In normal operation the set screw 136 prevents communication between the bores 127 and 128 (this is the position shown in FIG. 5). The compression spring 147 (FIG. 7) urges the conical end 150 of the valve 149 into one end of the bore 140. The force by which the valve 149 is urged into the bore 140 can be adjusted by turning the adjusting knob 146.

As in the preceding embodiment, the implement will exert a force on the coupling rod 99 so that the piston 112 with the rod 113 tends to move along the cylinder 111 in the direction of the arrow 166. In dependence upon the weight of the loaded implement, the pressure gauge 157 will indicate a given value, for example, in kilograms, if the closure member 167 is open and the valve 160 is closed. The spring 147 holds the closure member 149 closed in the operational condition. The piston 112 can be displaced along the cylinder 111 to change the length of the coupling rod. To do this, the closure members 160 and 136 are opened. The spaces 108 and 109 and the overflow reservoir 158 then communicate with one another. The piston 112 can then be displaced along the cylinder 111 so that the volume of the spaces 108 and 109 on the two sides of the piston 112 will vary. The hydraulic fluid displaced from one space can flow through the duct 129 towards the other. Since there is a piston rod only on one side of the piston 112, there will be either an excess or a deficiency of fluid in the space 108 or 109 depending on the direction of movement of the piston. The excess or deficiency of fluid can flow into or be made up from the reservoir 163. When the piston rod 112 is in preselected position in the cylinder 111, the closure members 136 and 160 can be closed so that the relative positions of the piston and the cylinder are again fixed. If the implement is likely to bring about such a high load that the pressure gauge 157 is in danger of overloading, the closure member 167 can be closed so that the gauge 157 is isolated.

The valve 149 may serve as a safety mechanism should, for example, the rear of the distributor abut against some object, for example during manoeuvring. If this happens, the piston 112 is subjected to a force in a direction opposite the arrow 166. The fluid in the space 108 is pressurized so that the valve 150 is opened against the pressure of the spring 147. Then fluid can flow from the space 108 towards the space 109. Since the rod 113 is located in that space, more fluid will flow out of the space 108 than can be admitted into the space 109. For this purpose the valve 160 has a spring 170 which subjects the valve 160 to such a force that in normal operation the valve is not opened, but in the case of the load as mentioned above it opens to allow fluid pressed out of the space 108 to pass partly into the reservoir 158. For adjusting the desired tensions of the spring 147 and 170 the knobs 146 and 171 can be adjusted.

The construction of the safety mechanism comprising the valve 149 may also be successfully employed when the piston 112 is provided with an auxiliary piston rod as shown in FIGS. 1 to 4. In this case an overflow reservoir is not provided and the tension of the spring 147 can then be chosen independently of the tension in a spring such as the spring 170 for the closure member 160.

While various features of the coupling member that have been described, and that are illustrated in the drawings, will be set forth in the following claims as inventive features, it is to be noted that the invention is not necessarily limited to these features and that it encompasses all of the features that have been described both individually and in various combinations.

What we claim is:

1. An elongated coupling member of adjustable length for use as a stay or strut, comprising a cylinder and a piston movable within said cylinder, the outer ends of the member mounting couplings and said piston being mounted on a rod, said rod extending through opposite ends of said cylinder and at both sides of said piston, chambers within said cylinder at each opposite side of said piston and the two chambers forming part of a closed hydraulic circuit, the movement of said piston and rod being accompanied by movement of fluid through duct means interconnecting one chamber to the other and a change in the length of said coupling member, valve means in said duct means normally preventing fluid flow and retaining a preselected length of said member, said duct means comprising an overload channel that communicates fluid from one chamber to the other chamber through a check valve upon overload indicating means in said circuit that signals the fluid pressure in the circuit and said one chamber when the valve means is closed, and the load being sustained by said coupling member, a further channel interconnecting said chambers with one another through at least one further valve to permit adjustment of the length of said member.

2. A coupling member as claimed in claim 1, wherein one outer end of said cylinder is a coupling and the opposite end thereof has a cap, said rod extending from said coupling, through said piston and both chambers, said rod being slideable in said cap, said indicating means being a pressure gauge in communication with said one chamber by a bore.

3. A coupling member as claimed in claim 1, in which a closure valve in the circuit is adjustable to vary the flow cross-section between said gauge and said one chamber.

4. A coupling member as claimed in claim 1, wherein said overload channel extends through said piston.

5. An elongated coupling member of adjustable length for use as a stay or strut, comprising a cylinder and a piston movable within said cylinder, the outer ends of said member mounting couplings and said piston being mounted on a rod, a respective chamber within said cylinder at each opposite side of said piston, the two chambers forming part of a hydraulic circuit in which fluid can be communicated from one chamber to the other to change the length of said member, said chambers being interconnected by duct means, valve means in said duct means that normally closes said duct means and maintains a preselected length of said member and a reservoir for fluid displaced to and from one chamber being in communication with said cylinder, said duct means comprising an overload channel that communicates fluid from said one chamber to said reservoir through a check valve upon overload, indicating means that signals the fluid pressure in said one chamber and when said valve means is closed, and the load being sustained by said coupling member, a further channel interconnecting said chambers with one another through at least one further valve to permit adjustment of the length of said member.

6. A coupling member as claimed in claim 5, in which communication between the two chambers includes an adjustable safety mechanism which is operative, upon overload, to allow fluid to flow between the chambers and relative movement of the two couplings in a direction opposite to that in which they tend to move during normal operation.

7. A coupling member as claimed in claim 6, in which said safety mechanism comprises a safety valve that communicates with said reservoir.

8. A coupling member as claimed in claim 7, in which the safety valve has a valve member which extends substantially parallel to the piston rod.

9. A coupling member as claimed in claim 8, in which the safety valve comprises a spring that biases the valve closed and said valve being adjustable to vary the bias of said spring.

* * * * *